United States Patent [19]
Evans et al.

[11] Patent Number: 5,926,808
[45] Date of Patent: Jul. 20, 1999

[54] DISPLAYING PORTIONS OF TEXT FROM MULTIPLE DOCUMENTS OVER MULTIPLE DATABASES RELATED TO A SEARCH QUERY IN A COMPUTER NETWORK

[75] Inventors: David A. Evans; Michael J. McInerny, both of Pittsburgh, Pa.

[73] Assignee: Claritech Corporation, Pittsburgh, Pa.

[21] Appl. No.: 08/900,639

[22] Filed: Jul. 25, 1997

[51] Int. Cl.$^6$ ............................................. G06F 17/30
[52] U.S. Cl. .................. 707/3; 707/4; 707/5; 707/10; 707/104; 707/1; 707/513
[58] Field of Search ................... 707/1, 2, 3, 4, 707/5, 6, 7, 9, 10, 100, 104, 200, 501, 513, 526, 531; 395/200.48; 364/282.1, 283.1, 283.3, 225.4, 225.6, 225, 225.3

[56] References Cited

U.S. PATENT DOCUMENTS

| | | | |
|---|---|---|---|
| 5,050,071 | 9/1991 | Harris et al. | 707/1 |
| 5,265,065 | 11/1993 | Turtle | 707/4 |
| 5,280,573 | 1/1994 | Kuga et al. | 345/338 |
| 5,379,366 | 1/1995 | Noyes | 706/55 |
| 5,598,557 | 1/1997 | Doner et al. | 707/5 |
| 5,671,404 | 9/1997 | Lizee et al. | 707/5 |
| 5,721,906 | 2/1998 | Siefert | 707/9 |
| 5,748,954 | 5/1998 | Mauldin | 707/10 |
| 5,761,497 | 6/1998 | Holt et al. | 707/5 |

*Primary Examiner*—Wayne Amsbury
*Assistant Examiner*—Srirama Channavajjala
*Attorney, Agent, or Firm*—Jones Day Reavis & Pogue; Blaney Harper

[57] ABSTRACT

The system of the present invention provides for a method and apparatus of displaying portions of text from multiple documents over multiple databases related to a search query. The initial step in this method is to identify a search query. Based on this identification, a search against multiple databases is initiated. In particular, the computer system identifies auxiliary databases either within a network or between networks that are likely to contain documents relating to terms in the search query. Upon identification of these databases, the databases are then searched to identify those documents relating to the identified query. The various sets of identified documents from multiple databases are then returned and processed to create an ordered ranking for the returned documents. Text portions from the highest ranking documents across the multiple databases are then automatically displayed to the user.

10 Claims, 6 Drawing Sheets

```
\*
# 1
\#
BW REPORT #22:
\#
\!
-1 (PA VIEW) ( ) T
-1 (IS) ( ) V
-1 (COMPARED) ( ) V
-1 (TO) ( ) P
-1 (PREVIOUS EXAMINATION) ( ) T
-1 (DATED) ( ) V
-1 (10 22 91) ( ) X
$
-1 (SURGICAL CLIP) ( ) T
-1 (ARE) ( ) V
-1 (AGAIN) ( ) A
-1 (SEEN) ( ) V
-1 (ALONG) ( ) P
-1 (RIGHT MEDIASTINUM) ( ) T
-1 (AND) ( ) C
-1 (RIGHT HILAR REGION) ( ) T
$
-1 (ARE) ( ) V
-1 (NEW SURGICAL CLIP) ( ) T
-1 (IN) ( ) P
-1 (DISTRIBUTION) ( ) T
-1 (OF) ( ) P
-1 (CIRCUMFLEX ARTERY) ( ) T
-1 (AS WELL AS) ( ) C
-1 (4 INTACT STERNOTOMY WIRE) ( ) T
$
-1 (IS) ( ) V
-1 (PERSISTENT INCREASED RIGHT PARAMEDIASTINAL OPACITY) ( ) T
-1 (POSSIBLY) ( ) A
-1 (RELATED) ( ) V
-1 (TO) ( ) P
-1 (PREVIOUS RADIATION THERAPY) ( ) T
$
-1 (NEW PLATE LIKE OPACITY) ( ) T
-1 (ARE) ( ) V
-1 (SEEN) ( ) V
```

*FIG. 4*

DISPLAYING PORTIONS OF TEXT FROM MULTIPLE DOCUMENTS OVER MULTIPLE DATABASES RELATED TO A SEARCH QUERY IN A COMPUTER NETWORK

FIELD OF THE INVENTION

This invention relates in general to computer databases. In particular, this invention relates to locating and generating connections between concepts identified in a source document and data objects distributed throughout multiple databases in a computer network.

BACKGROUND OF THE INVENTION

The volume of documents in databases is rapidly expanding. It has been estimated that in excess of 90% of all desired intelligence information is available in documents residing in accessible databases. Additionally, the number and size of computer databases available to computer users is expanding rapidly. This expansion is due both to the availability of multiple databases within a single network and the availability of multiple networks to a single computer. A major concern facing the user of a computer system that has access to multiple databases both within a network and between networks is the ability to conveniently locate relevant information. This problem is compounded in computer networks because the user is likely to be unaware of a number of databases across a network that contain relevant information.

Typically, document retrieval from databases involves multiple user-driven searches across many different databases. The problem with this search technique is that it is often cumbersome because it requires significant interaction by the user to access many different databases. To cope with the ever-increasing expansion of databases across networks, recent attempts have been made at automating search processes. These improved systems have employed the generation of hyperlinks. Hyperlinks are ways of connecting the text of two documents together. Hyperlinks operate on a page image shown to a database user. A phrase or text section on the page image will be highlighted. When a user selects this phrase (clicks on it with a mouse), the user is immediately shown related text from another document. These hyperlinks are hardcoded links between a specific term and a specific set of text within a database or text on another network. The hyperlinks are useful because they allow a user to quickly retrieve documents related to the highlighted phrase without manually constructing and executing different searches. An example of conventional hyperlinks is U.S. Pat. No. 5,603,025 to Tabb, et al. In this patent, a hypertext report writing module is created in which hypertext links are automatically embedded in documents from the database.

Although useful, conventional hypertext links are difficult to implement and use because these hypertext links have to be coded into the database itself. This fact renders conventional hypertext links inadequate for general purpose use in a computer network housing large quantities of distributed data. This is because the volume of potential hyperlinks is extremely large and the manual generation of such hardcoded links is, as a result, time consuming and expensive in large text databases.

Also, since hyperlinks are pre-determined relationships between specified terms in databases, it is generally not feasible to categorize many large databases to make predetermined relationships for all items of potential interest. Moreover, conventional hypertext links are normally static. That is, even if there were enough resources to hardcode enough hypertext links to make them useful in a database, the process of hardcoding the links would only occur once. Thus, databases with hardcoded hyperlinks would not be linked to new data. These hyperlinks miss updates in the data. They also miss the addition of new databases to networks. The pre-determined and static nature of the hyperlinks as they currently exist makes them inappropriate for dynamically changing databases and difficult to use in distributed databases for information retrieval on wide ranging subjects. Accordingly, conventional search techniques have failed to address the need for a process capable of automatically generating connections between texts in different documents across multiple databases. Additionally, conventional search techniques have failed to provide a connection generating technique that can adapt to databases that are modified on a real time basis.

OBJECTS OF THE INVENTION

It is the object of the present invention to analyze documents in a database system.

It is a further object of the present invention to analyze documents in a database system by making connections between parts of related text in different documents.

It is still a further object of the present invention to analyze documents in a database system by automating the process of connecting related text between different documents over multiple databases.

It is still a further object of the present invention to analyze documents in a database system by automating the process of connecting related text between different documents across multiple computer networks.

SUMMARY OF THE INVENTION

The system of the present invention provides a method of and apparatus for displaying portions of text from multiple documents over multiple databases related to a search query. The initial step in this method is to identify a search query. Based on this identification, a search against multiple databases is initiated. In particular, the computer system identifies auxiliary databases either within a network or between networks that are likely to contain documents relating to terms in the search query. Upon identification of these databases, the databases are then searched to identify those documents relating to the identified query. The various sets of identified documents from multiple databases are then returned and processed to create an ordered ranking for the returned documents. Text portions from the highest ranking documents across the multiple databases are then automatically displayed to the user.

BRIEF DESCRIPTION OF THE DRAWINGS

FIG. 4 is an illustration of a listing of text that results from a noun phrase parsing process.

DETAILED DESCRIPTION OF THE INVENTION

Figure 1:
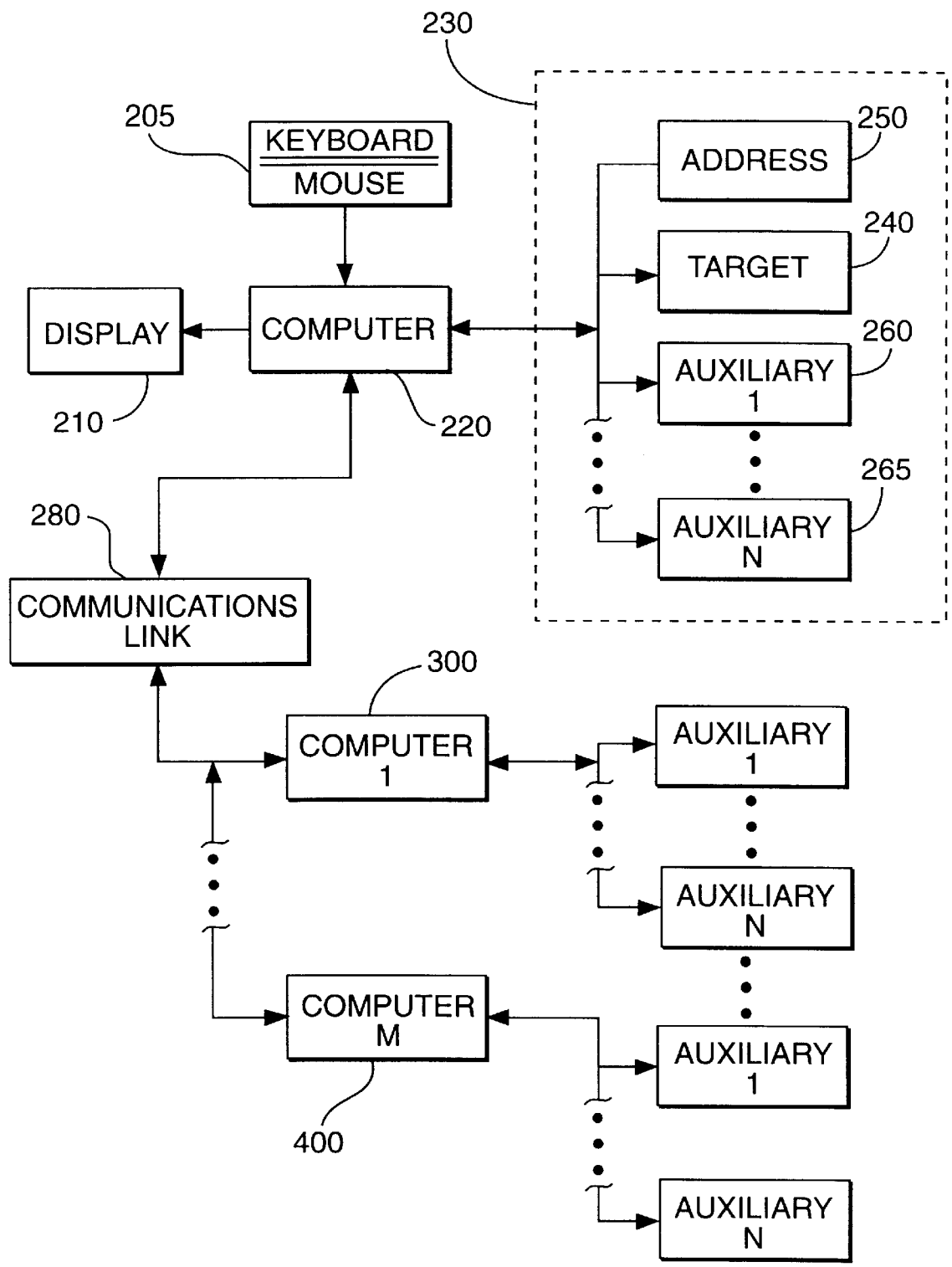
FIG. 1 is an illustration of a computer system that operates according to the present invention for displaying text portions from multiple databases.

FIG. 1 illustrates a computer system for searching databases. The computer 220 is connected to a display 210, an input system 205 (including for example, a keyboard and mouse) a memory system 230 and a communications link 280. Normally, the communications link is a simple modem. It could also be a higher rate direct connection between computers or another device for interconnecting computer systems. The communications link 280 is in turn connected to a network of M other computers each having their own memory systems. The memory system 230 associated with computer 220 has a memory section 240 that contains a target database and it includes N memory sections that store a series of N auxiliary databases. The target database in memory section 240 stores information that a user is currently interested in searching. The remaining N memory sections store auxiliary databases related to a variety of topics. The M computers attached to communications link 280 each have similar memory sections that store N auxiliary databases. In addition, memory section 250 of memory system 230 stores a list of database addresses and identifiers.

In general, the computer system of FIG. 1 operates to display information from a target file or database to a user. In the course of that general display of information, a user will often recognize a specific idea or concept from the displayed information that may or may not be directly relevant to the general information currently being displayed. The user will desire to access or link to information about this specific concept without losing access to the general information currently being displayed. The computer system of FIG. 1 operates to provide links between identified concepts and information contained in multiple databases. The computer system of FIG. 1 provides these links by causing the computer 220 to receive a query and identify databases having information relevant to the query. Once the databases are identified computer 220 causes them to be searched such that they return documents or passages of documents relevant to the query. The computer 220 then organizes the returned documents or passages thereof and displays at least a portion of the text associated with those documents.

Figure 2:
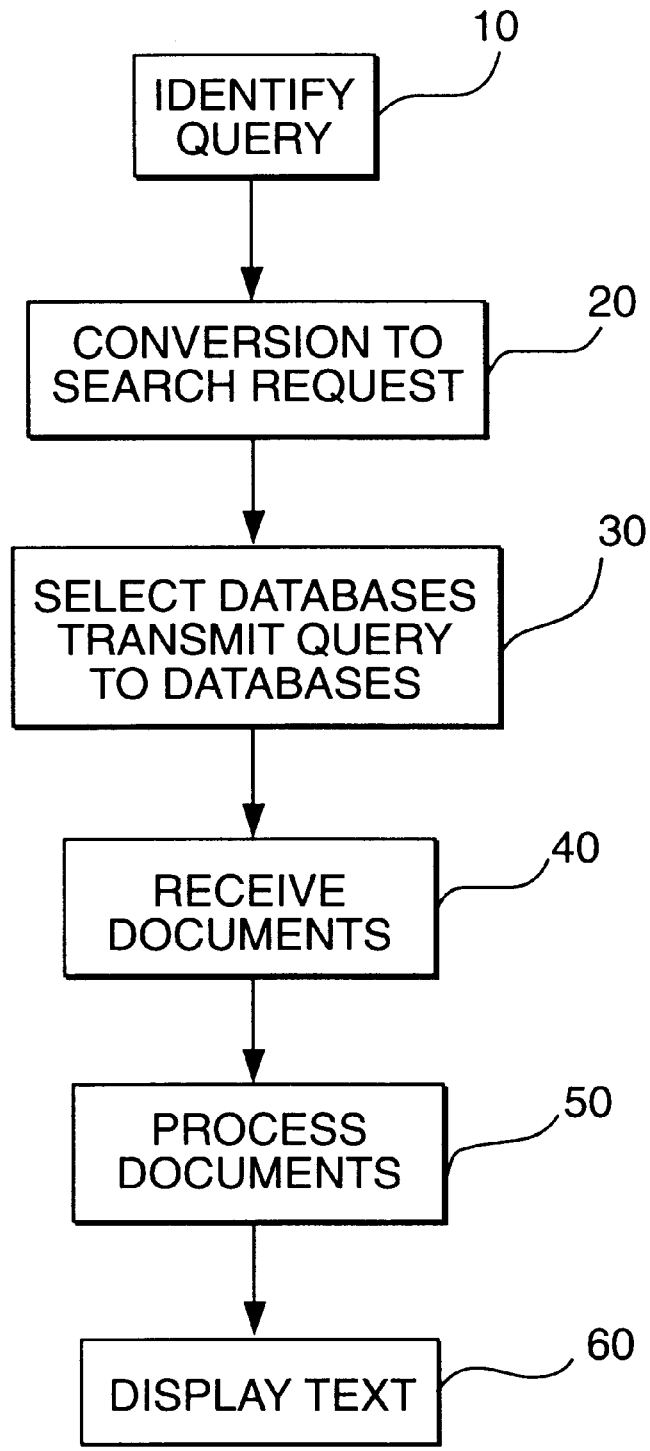
FIG. 2 is a flowchart that illustrates a process according to an embodiment of the present invention for displaying text portions relating to a query from multiple databases.

Specifically, FIG. 2 illustrates a process for operating the computer system of FIG. 1 according to the present invention. Initially, a query is identified in Step 10 of FIG. 2. This can be done by highlighting and selecting (through a conventional graphical user interface) a portion of text that the computer is already displaying. The query could also just be an input to the computer 220 made through a keyboard. Once the text of the query has been identified, the text is converted into a search request in step 20 of FIG. 2. Converting the identified query text into a search request involves the conventional steps of parsing the query text into terms and then making use of the terms to form a query. The form of the query will depend on the type of search technique that will be used to search the databases. Most search techniques use Boolean combinations of terms as the query. As a result, these techniques 'AND' the query terms together to form a query. Other search techniques make use of vector space analysis. In this case, the list of terms forms a query because the vector space algorithm does not use logical operators to form the query.

Once a query has been formed, step 30 of FIG. 2 selects the databases that will be searched. The computer system of FIG. 1 includes a memory space 250 that stores information to identify databases (and the types of information they store) or general database search engines. Since general database search engines, such as the Lycos™ engine on the World Wide Web have their own resources for selecting the particular databases to search for a given query, Step 30 merely transmits a Boolean combination of query terms to these search engines (unless a user opts out of such a selection). For other databases identified in memory space 250 of FIG. 1, a Boolean combination of query terms is compared against the description of the databases listed in memory space 250. As a result of this comparison, a set of auxiliary databases is selected that will be searched against the query.

Once the set of auxiliary databases is selected in Step 30 of FIG. 2, Step 40 begins the search process for the auxiliary databases selected in Step 30. Normally the target database will not be searched because the user is, presumably, already searching that database for the concepts of interest. However, the target database could also be selected in Step 30 and searched as well. Referring to FIG. 1, the search process is started by transmitting a query to each of the selected auxiliary databases that are associated with computer 220. Computer 220 will also transmit instructions and one or more forms of the search query to the M computers through the communications link 280. The instructions sent by computer 220 could, for example, instruct computer 300 to use the Lycos™ search engine to search databases on the World Wide Web for documents having a Boolean combination of the terms in the search query. The instructions sent by computer 220 could also, for example, instruct computer 400 to use a vector space search technique to search its associated auxiliary database N to retrieve documents related to the list of query terms. The documents retrieved in Step 40 from the auxiliary databases associated with the M computers are returned to computer 220 through communication link 280.

Once the documents retrieved from the auxiliary databases have been returned, computer 220 processes them in Step 50 of FIG. 2 to determine a rank order of the documents for display. The processing of step 50 is completely independent of the processing used to retrieve the documents. The retrieved documents, in effect, form an independent database that is analyzed by the computer 220. As a result, various search techniques for retrieving documents across computer networks can be utilized, but all the returned documents are analyzed according to an independent process. The processing of step 50 can be as simple as selecting the documents for display that are returned first. Alternatively, the processing of Step 50 ranks the order of the returned documents according to a hierarchy of the databases in which the documents were located.

Still another processing alternative for Step 50 is to perform a vector space analysis on the returned documents. This analysis will rank the returned documents based on their relevance to the query. In particular, a vector space analysis computes a similarity score between the terms in the query and each of the returned documents can be computed by evaluating the shared and disjoint features of the query terms and a document over an orthogonal space of T terms of the document. The score can be computed by the following formula:

$$S(Q_i, D_j) = \frac{Q_i \cdot D_j}{|Q| \cdot |D|} = \frac{\sum_{k=1}^{t}(q_{i_k} \cdot d_{i_k})}{\sqrt{\sum_{k=1}^{t} q_{i_k}^2} \cdot \sqrt{\sum_{k=1}^{t} d_{i_k}^2}}$$

Where $Q_i$ refers to terms in the query and $D_j$ refers to terms in the document.

Figure 3:
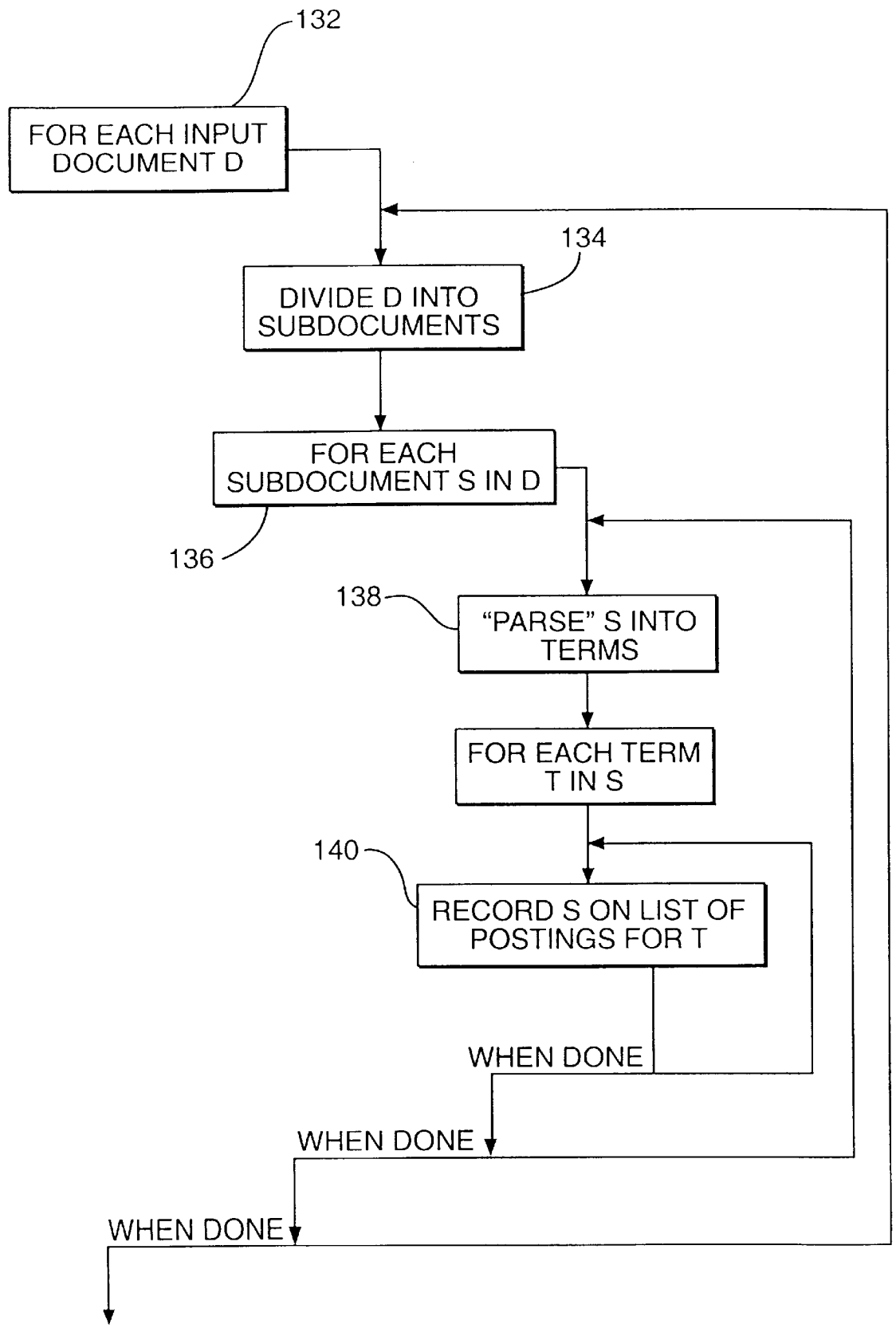
FIG. 3 is a flowchart that illustrates a process according to an embodiment of the present invention for inverting a database.

In order to score the retrieved documents, the set of retrieved documents is treated as a database and this database is inverted. The inversion step is a technique for creating a listing of all the terms of the database and the portions of the documents associated with those terms. FIG. 3 illustrates a process for inverting a database. In step 132, a document from the database is selected. In step 134, the document is broken into subdocuments. In this process, for example, each subdocument generally corresponds to a paragraph of the document. Long paragraphs may consist of multiple subdocuments and several short paragraphs may be included in a single subdocument. The subdocuments all have approximately the same length.

In steps 136 and 138 of FIG. 3 respectively, a subdocument is selected and parsed. In this example, the parsing process is a noun phrase parsing process. In this process, linguistic structure is assigned to sequences of words in a sentence. Those terms, including noun phrases, that have semantic meaning are listed. This parsing process can be implemented by a variety of techniques known in the art such as the use of lexicons, morphological analyzers or natural language grammar structures. FIG. 4 is an example listing of text passed for noun phrases. As is evident from the list of FIG. 4, the phrases tagged with a 'T' are noun phrases, words tagged with a 'V' are verbs, words tagged with an 'X' are quantities, words tagged with an 'A' are adverbs and so on.

Once the subdocument has been parsed, a term list containing noun phrases and their associated subdocument is generated in step 140. All the subdocuments for each document are processed in this way and the list of terms and subdocuments is updated. Finally, all the documents of a database are processed according to steps 132–140. The result of this inversion process is a term list identifying all the terms (specifically noun phrases in this example) of a database and their associated subdocuments.

Figure 5:
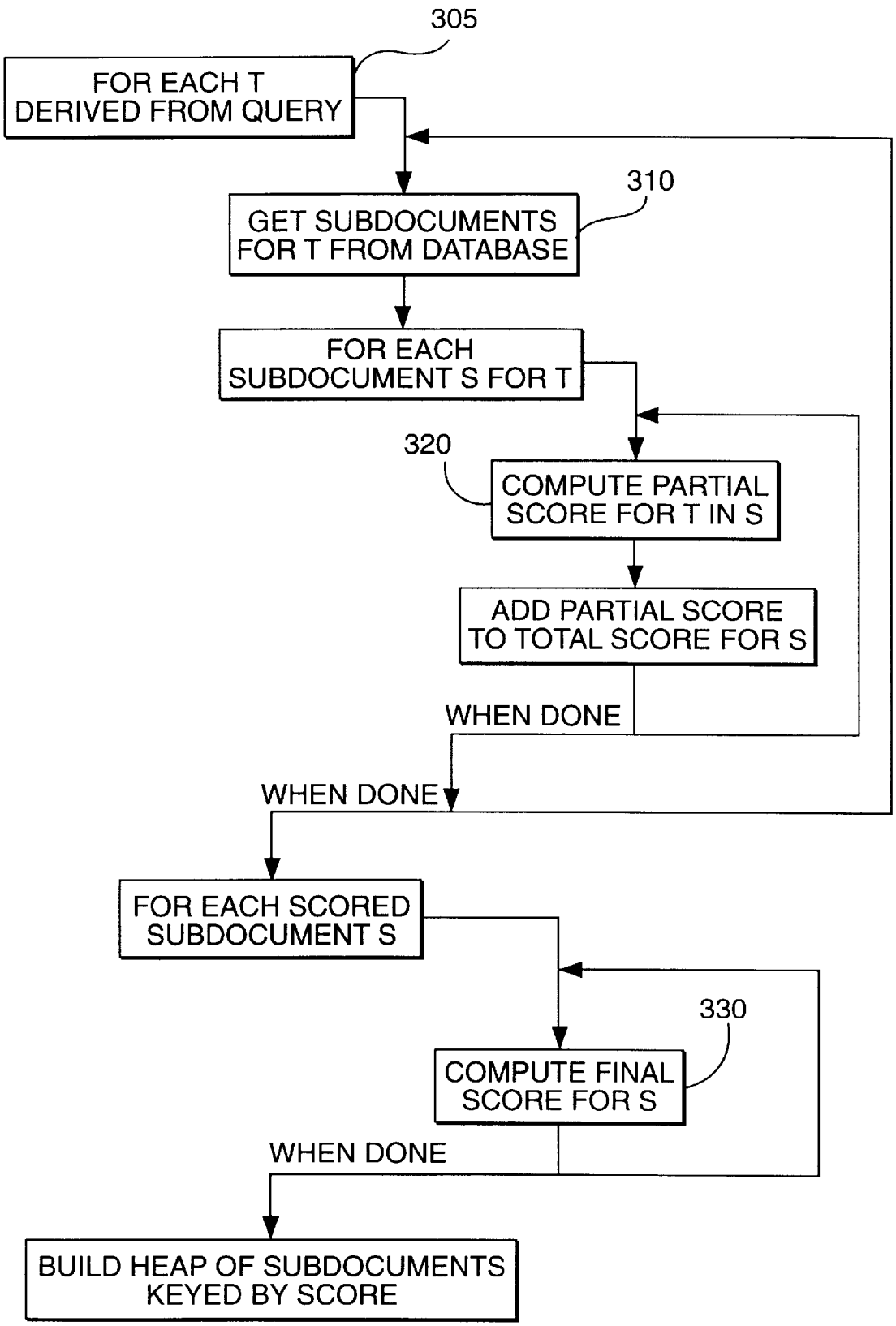
FIG. 5 is a flowchart that illustrates a process according to an embodiment of the present invention for scoring subdocuments.

Once the retrieved document database has been inverted, the subdocuments of that database are scored. FIG. 5 is an illustration of the scoring process. In step 310, the term list of the inverted database is searched to identify all the subdocuments that are associated with each term of the query that was identified in step 10 of FIG. 2. For each of the identified subdocuments, step 320 computes a partial similarity score (according to the general formula discussed above) for the query term and the subdocument. The computation process repeats for each query term and subdocument. In step 330, the partial scores for each subdocument are added or otherwise combined. As a result, when all the subdocuments have been scored for all the query terms, a subdocument score list is created in which each subdocument has an accumulated score.

Figure 6:
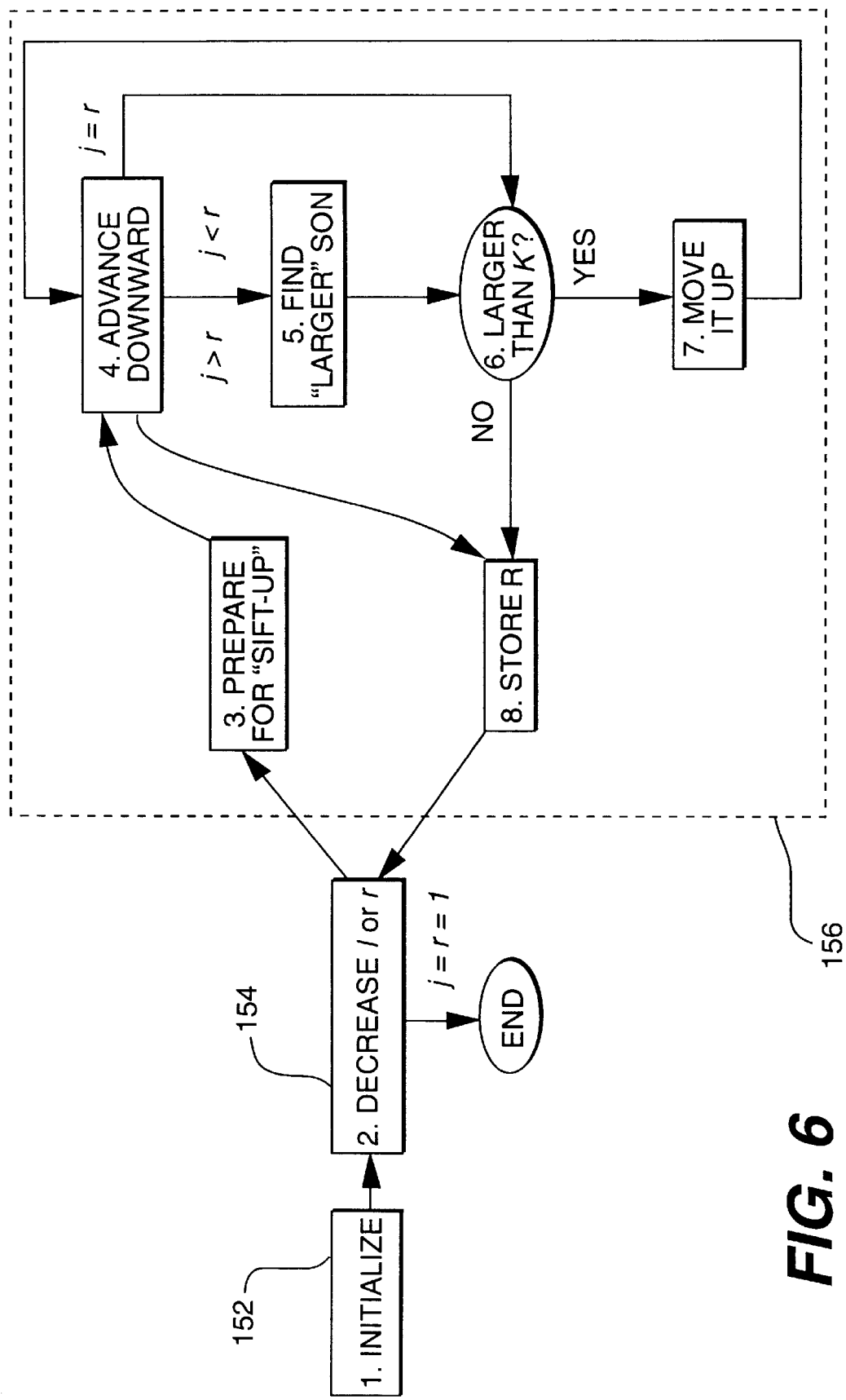
FIG. 6 is a flowchart that illustrates a process according to an embodiment of the present invention for sorting.

After step 330 of FIG. 5, the subdocument score list contains a number of subdocument entries that are not sorted relative to their scores. At this point, the process of step 50 sorts the subdocuments by their score. This sort operation is a modified heap sort on the subdocument score list. A heap sort process is a process in which a heap is first created and then the documents with the highest scores are selected off the top of the heap to make the final sort order. FIG. 6 illustrates a general algorithm for a heap sort process. This process is initialized by setting l=(N/2)+1 and r=N, where N is the number of subdocuments in the subdocument score list. Then, the process of FIG. 6 is operated until l=1 or r<N. This process places the N subdocument scores in a heap form. The N subdocument scores are in heap form when the root (highest or lowest score magnitude on the subdocument score list represented by vector a(N)) is stored at a(1), the children of a[i] are a[2i] and a[2i+1] and the magnitude of a[i/2]>a[i] for 1<i/2<i<N. When the subdocument score list is in a heap form, a[1]=max (a[i]) for 1<i<N. That is, the highest subdocument score is in the first position (a[1]) of the heap.

Since subdocuments are ranked by score to quickly select the most relevant subdocuments and since the most relevant subdocument is at the top of the heap, the process of step 50 (of FIG. 2) merely selects this subdocument for further processing by the computer 220. In step 60 of FIG. 2, the computer 220 then displays the document text associated with this highest ranked subdocument. The computer 220 can also display the text of the entire document associated with this subdocument. While the computer 220 is displaying the text of the highest ranking subdocument, the computer 220 is also processing in the background (according to step 50 of FIG. 2) the remaining entries in the subdocument score list to reheapify them (i.e., reorganize them back into a heap form after the highest value subdocument has been removed). As a result, when the next highest order subdocument is sought by computer 220, it can be merely selected off the top of the heap and displayed. The remaining entries in the subdocument list would then be reheapified again.

According to the process illustrated in FIG. 2, once a user has selected a query (through highlighting text or otherwise), the computer system automatically connects the user to text portions of documents that are specifically related to the query. These text portions are retrieved from databases that do not have any particular structure or coded links in them. Additionally, these links are provided in spite of the fact that the set of returned documents may have been generated by different search techniques from different sources. Moreover, since the returned documents are automatically displayed, the user avoids the necessity of reorganizing the returned documents which may have been retrieved based on a variety of database search techniques.

While the invention has been particularly described and illustrated with reference to a preferred embodiment, it will be understood by one of skill in the art that changes in the above description or illustrations may be made with respect to formal detail without departing from the spirit and scope of the invention.

We claim:

1. A method for automatically displaying text from a database related to a query, comprising:

generating a query by selecting a region of text from a document;

automatically selecting a plurality of databases related to said query;

automatically searching at least one database for documents related to said query;

organizing documents returned from said search in a relevance order corresponding to the relevance of said returned documents to said query; and displaying portions of test related to said query from a plurality of said returned documents in said relevance order.

2. A method for automatically displaying text from a database related to a query, as in claim 1, wherein:

said document incorporating said selected region of text is stored in a database that is not related to said query.

3. A method for automatically displaying text from a database related to a query, as in claim 1, wherein:

said organization of said returned documents computes a relevance score for said returned documents and rank orders the returned documents according to said relevance score.

4. A method for automatically displaying text from a database related to a query, as in claim 1, wherein:

said automatic searching of the selected database compares document text of said selected database to boolean combinations of keywords.

5. A method for automatically displaying text from a database related to a query, as in claim 4, wherein:

said organization of said returned documents computes a relevance score for said returned documents and rank orders the returned documents according to said relevance score.

6. A system for displaying text from a database related to a query, comprising:

a computer coupled to an input/output device for generating a query, said query is generated by selecting a region of text from a document;

said computer coupled to a disk storage unit, said computer selects a plurality of databases related to said query, wherein said databases are identified by address in said disk storage unit;

said computer automatically searches at least one database for documents related to said query;

said computer organizes documents returned from said search in a relevance order corresponding to the relevance of said returned documents to said query; and said computer coupled to a display unit for displaying portions of text related to said query from a plurality of said returned documents in said relevance order.

7. A system for displaying text from a database related to a query, as in claim 6, wherein:

said document incorporating said selected region of text is stored in a database that is not related to said query.

8. A system for displaying text from a database related to a query, as in claim 6, wherein:

said organization of said returned documents computes a relevance score for said returned documents and rank orders the returned documents according to said relevance score.

9. A system for displaying text from a database related to a query, as in claim 6, wherein:

said automatic searching of the selected database compares document text of said selected database to boolean combinations of keywords.

10. A system for displaying text from a database related to a query, as in claim 9, wherein:

said organization of said returned documents computes a relevance score for said returned documents and rank orders the returned documents according to said relevance score.

* * * * *